United States Patent Office 3,548,289
Patented Dec. 15, 1970

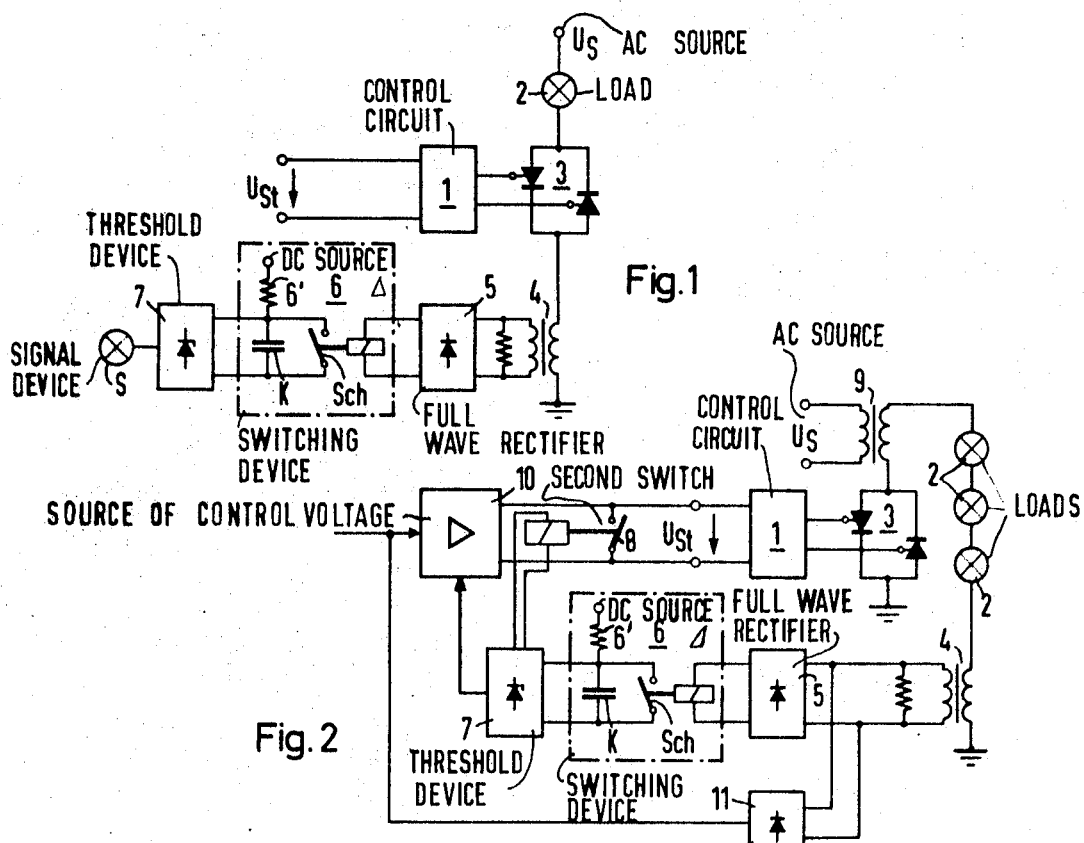

3,548,289
APPARATUS FOR SUPERVISING THE CURRENT SUPPLIED TO LOADS VIA ANTIPARALLEL-CONNECTED THYRISTORS
Manfred Liska and Klaus Hübner, Munich, Germany, assignors to Siemens Aktiengesellschaft, a corporation of Germany
Filed Apr. 14, 1969, Ser. No. 815,953
Claims priority, application Switzerland, Apr. 16, 1968, 5,589/68
Int. Cl. G05f 1/20; H02h 7/00
U.S. Cl. 323—9                            10 Claims

ABSTRACT OF THE DISCLOSURE

When the load current of a load energized via antiparallel-connected thyristors decreases to zero it causes a switch to open thereby diverting the discharge path of a capacitor to a threshold device. If the discharge current of the capacitor exceeds the threshold level of the threshold device the device actuates a signal device or prevents the application of a control voltage to the thyristors.

---

The present invention relates to the control of load currents for loads supplied via antiparallel-connected thyristors. More particularly, the invention relates to apparatus for supervising the current supplied to loads via antiparallel-connected thyristors.

The thyristors are connected in antiparallel relation to a load and a source of alternating electrical voltage which energizes said load. Each of the thyristors has a control electrode for controlling the conductivity condition thereof. A control circuit connected to the control electrodes of the thyristors supplies periodically alternate pulses having phase positions relative to the alternating voltage of the source of electrical power and dependent upon a control voltage.

Apparatus of the type described cannot utilize a conventional method of measuring current flowing through the load by current measurement and actuate a signal when the current decreases to zero. In loads energized via antiparallel-connected thyristors, the current decreases to zero periodically during each half cycle, during operation. A supervisory control circuit should not respond to the normal decrease of the load current to zero during each half cycle. On the other hand, a median value for the load current is not desirable, since the components required to attain said median value would cause too great a delay in the indication due to considerable variations in the deformation factor.

The principal object of the present invention is to provide new and improved apparatus for supervising the current supplied to loads via antiparallel-connected thyristors.

An object of the present invention is to provide apparatus for supervising the current supplied to loads via antiparallel-connected thyristors, which apparatus responds to a current failure after a single half cycle of the energizing voltage for the load.

An object of the present invention is to provide apparatus for supervising the current supplied to loads via antiparallel-connected thyristors, which apparatus functions with efficiency, effectiveness and reliability.

An object of the present invention is to provide apparatus for supervising the current supplied to loads via antiparallel-connected thyristors, which apparatus is of simple structure.

In accordance with the present invention, a capacitor is connected to a DC voltage source via a resistor and is connected in parallel with a switch which is controlled in accordance with the instantaneous value of the load current in a manner whereby said switch is closed during the time that current flows through the load. A threshold device is connected to the capacitor and has a threshold level which is such that it provides a signal only when the switch has not been closed at least during one half cycle or half period of the alternating voltage which supplies the load.

It is sometimes desirable to disconnect the energizing voltage of the load when the load current fails, rather than merely to indicate such load current failure by signal. Thus, for example, when a plurality of voltage loads are connected in series and are supplied by a single high voltage source such as, for example, the secondary winding of a high voltage transformer, when one of the loads fails, the entire secondary voltage of the transformer is applied to the one load which fails. This also applies to loads which are controlled through thyristors connected in antiparallel with each other and in series circuit arrangement with the primary winding of the high voltage transformer.

An antiparallel connection of thyristors is one in which a pair of thyristors are connected in parallel with each other in opposite polarities, so that the anode of one and the cathode of the other are connected in common and the cathode of the first and the anode of the second are also connected in common. Actually, when a load fails, idle transformer current continues to flow on the primary side if the control or firing pulses of the thyristors are not disconnected. Accordingly, in a preferred embodiment of the present invention, a signal is supplied to the switch to actuate said switch when the current on the secondary side of the high voltage transformer decreases to zero. The actuation of the switch abruptly cuts off the control voltage supplied from the source of control voltage to the control circuit.

In control apparatus, a circuit which supplies the actual or pilot value of the load current may be opened when said load current decreases to zero. The actual value of the current thus becomes zero. This corresponds to an increase in the difference between an assumed reference or datum value and the pilot value of the current, which also increases the magnitude of the control signal so that the load or loads may become overloaded. Such opening of the supply circuit may occur especially when the actual current is provided by a current transformer, one lead of which opens. The switch may be controlled in accordance with the instantaneous value of the secondary current of the current transformer.

In accordance with the present invention, apparatus supervises the current supplied to loads via antiparallel-connected thyristors. The thyristors are connected in antiparallel-relation to a load and a source of alternating electrical power for energizing the load. Each of the thyristors has a control electrode for controlling the conductivity condition thereof. The apparatus for supervising the current supplied to the loads comprises a control circuit connected to the control electrodes of the thyristors for supplying periodically alternate pulses having phase positions relative to the alternating voltage of the source of electrical power and dependent upon a control voltage. A capacitor is connected to a source of direct voltage via a resistor. A switch is connected in parallel with the capacitor and is controlled in accordance with the instantaneous value of the load current in a manner whereby the switch remains closed during the time that load current flows thereby providing a discharge path for the capacitor. A threshold device is connected to the capacitor. The threshold device has a threshold level adjusted so that the threshold device provides an output signal only if the switch has been open for at least the duration of a half period of the alternating voltage. A utilization device is connected to the threshold device and responds to an output signal of the threshold device to provide a determined operation.

The utilization device may comprise a signal device or an additional switch for deenergizing the control circuit. A source of control voltage applies the control voltage to the control circuit. An additional switch connects the source of control voltage to the control circuit. The utilization device comprises the additional switch and an output signal of the threshold device controls the additional switch to disconnect the source of control voltage from the control circuit thereby reducing the control voltage to zero.

The source of control voltage comprises a control amplifier having an output connected to the control circuit via the additional switch and an input. A reference source is coupled between the load and the input of the control amplifier for supplying to the control amplifier a signal corresponding to the difference between a reference value and an actual value of current. The signal responds to the median value of the load current. The reference source of the source of control voltage is coupled to the load via a transformer having a primary winding connected to the load and a secondary winding connected to the reference source. The transformer controls the switch in accordance with the instantaneous value of current in the secondary winding.

The switch may comprise a transistor having emitter, collector and base electrodes and an emitter-collector path connected in parallel with the capacitor. The transistor is coupled to the load in a manner whereby the transistor is controlled in conductive condition by the load current. An additional switch is coupled between the source of control voltage and the transistor for controlling the transistor in conductive condition in accordance with the control voltage provided by the source of control voltage. The utilization device comprises the source of control voltage. The additional switch comprises a second threshold device having a second threshold level for switching the transistor to its conductive condition when the control voltage provided by the source of control voltage is less than the second threshold level. A third threshold device is connected between the capacitor and an additional transistor for controlling the additional transistor in conductive condition. The third threshold device has a third threshold level smaller than or equal to the threshold level of the threshold device. The additional transistor is coupled to the transistor and controls the transistor in conductive condition.

In order that the present invention may be readily carried into effect, it will now be described with reference to the accompanying drawings, wherein:

FIG. 1 is a block diagram of an embodiment of the apparatus of the present invention for supervising the current supplied to leads via antiparallel-connected thyristors;

FIG. 2 is a block diagram of another embodiment of the apparatus of the present invention; and FIG. 3 is a block diagram of still another embodiment of the apparatus of the present invention.

In the figures, the same components are identified by the same reference numerals.

In FIG. 1, a visual signal S is actuated when the load current drops to zero. The apparatus of the embodiment of FIG. 1 comprises a control circuit 1. The control circuit 1 is connected to the control electrodes of a pair of thyristors 3 connected in antiparallel relation to a load 2 and a source $U_S$ of alternating voltage for energizing said load. The control circuit 1 periodically supplies firing pulses to the thyristors 3, alternately to each thereof.

The load 2 and the antiparallel-connected thyristors 3 are connected in series circuit arrangement with the primary winding of a current transformer 4. The source of alternating voltage $U_S$ for energizing the load 2 is connected in series with the series circuit arrangement. The secondary winding of the current transformer 4 is connected to the input of a full wave rectifier 5. The output voltage of the rectifier 5 is applied to a switching device 6. The switching device 6 comprises a capacitor K connected via a resistor 6' to a direct voltage source D. A switch Sch is connected in parallel with the capacitor K. The switch Sch is actuated by a relay which in turn is energized by the output of the full wave rectifier 5.

The capacitor voltage is applied to a threshold device 7 connected in parallel with the capacitor K. The threshold device 7 is actuated, and produces an output signal, when the capacitor voltage applied to it exceeds the threshold level or voltage of said threshold device. The output voltage of the threshold device is applied to the signal device S, to actuate said signal device.

The control circuit 1 supplies firing pulses to the thyristors 3. The firing pulses supplied to the thyristors 3 have a specific phase angle relative to the alternating voltage $U_S$ which energizes the load 2. Thus, a specified current flows through the load 2 and through the primary winding of the transformer 4. A voltage proportional to the current is provided by the transformer 4 and is rectified by the full wave rectifier 5. The rectified voltage controls the switch arm Sch of the switch device 6 via the relay control connected to the output of said rectifier.

The switch arm Sch of the switching device 6 is periodically closed and thereby periodically provides a discharge path therethrough for the capacitor K. Since the capacitor K is periodically discharged through the switch arm Sch, the capacitor voltage does not reach the threshold level or voltage of the threshold device 7. Thus, the threshold device 7 does not produce an output signal and the signal device S remains inoperative.

The capacitor voltage of the capacitor K exceeds the threshold level of the threshold device 7 only after said capacitor has not been discharged for a period slightly longer than half a period or cycle of the energizing voltage of the AC source $U_S$. When there is a current failure or stoppage, the current in the secondary winding of the transformer 4 drops to zero. There is thus no voltage supplied to or rectified by the full wave rectifier 5. The switch arm Sch of the switching device 6 thus remains open, as shown in FIG. 1, and prevents the discharge of the capacitor K. The capacitor voltage thus increases and reaches the threshold level or threshold voltage of the threshold device 7, if the current failure exists for longer than one half wave, cycle or period. The threshold device 7 thus produces an output signal which actuates the signal device S to provide a visual alarm that there is a current failure.

The embodiment of FIG. 2 incorporates that of FIG. 1. The distinction between the embodiment of FIG. 2 and that of FIG. 1 is that in the embodiment of FIG. 2 the thyristors 3 energize a high voltage transformer 9. The AC source $U_S$ is connected across the primary winding of the high voltage transformer 9. The secondary winding of the high voltage transformer 9 is connected in series circuit arrangement with a plurality of loads 2 and the primary winding of the current transformer 4. When one of the loads 2 fails, the full voltage provided by the transformer 9 is applied thereto and may cause serious damage to insulation and the like. It is thus necessary that the energizing voltage $U_S$ be disconnected or discontinued in the event of current failure. To accomplish this, the output signal or voltage of the threshold device 7 is utilized to control the firing of the thyristors 3 via a second switch 8 or a source of control voltage 10.

If one of the loads 2 fails, the current through the primary winding of the current transformer 4 drops to zero, as in the case of the embodiment of FIG. 1. The switch arm S$ch$ of the switching device 6 thus remains open, as shown in FIG. 2, and the capacitor voltage of the capacitor K increases until it reaches the threshold level of the threshold device 7. When its threshold level is exceeded, the threshold device 7 produces an output signal which closes the second switch 8 via a relay or any other suitable device. When the switch 8 is closed, it short-circuits the control voltage applied to the control circuit 1 from the source of control voltage 10. This is due to the fact that the source of control voltage 10 energizes the control circuit 1 to provide firing current for the thyristors 3 and the second switch 8 is connected between said source and said control circuit in a manner whereby when said switch is closed, it short-circuits the connecting lines between said source and said control circuit. When the connecting supply circuit to the control circuit 1 is short-circuited by the closing of switch 8, said control circuit ceases its supply of firing pulses to the thyristors 3 and the loads 2 are deenergized beginning with the zero passage of the energizing voltage of the AC source $U_S$.

When the load is energized under the control of a regulator, the switching device 6 is connected to the secondary side of the transformer which delivers the actual or pilot value of the current. This type of regulator or regulating circuit includes the source of control voltage 10, which source comprises a control amplifier. The regulating circuit also includes an additional full wave rectifier 11 which provides the actual current value. The additional rectifier 11 provides a voltage which is proportional to the median value of the load current which constitutes the actual current magnitude.

The threshold device 7 is directly connected to the control amplifier 10, rather than to the second switch 8, in this case. Thus, when the threshold device 7 produces an output signal, said output signal actuates an electronic switch in the control amplifier which short-circuits the input voltage in one of the amplifier stages of said control amplifier. This decreases the control voltage supplied by the control amplifier 10 to the control circuit 1 to zero. The control circuit 1 thus ceases its supply of firing pulses to the thyristors 3 and the loads 2 become deenergized during the next succeeding zero passage of the energizing voltage of the AC source $U_S$.

The switching device 6 responds to the failure of the load current in the same manner as in the embodiment of FIG. 1. This often occurs when the loads 2 and the regulating circuit are separated by a distance and longer leads are required for the feedback. If the regulating device is utilized exactly for this purpose, it may also be utilized in comparison with loads which are not energized via a high voltage transformer.

FIG. 3 illustrates another embodiment of the apparatus of the present invention. In FIG. 3, the switching device is disclosed in considerably greater detail. The switching device in the embodiment of FIG. 3 comprises the capacitor K connected to a source of direct voltage D via a resistor $r$. A first transistor $p1$ is connected with its emitter-collector path in parallel with the capacitor K. A second transistor $p2$ is connected with its emitter electrode in common with the emitter electrode of the first transmitter and with its collector electrode connected to the base electrode of the first transistor $p1$ via a diode $n2$.

A diode $n1$ is connected in series circuit arrangement with the diode $n2$, the full wave rectifier 5 and the secondary winding 4' of the current transformer 4. The base electrode of the first transistor $p1$ is connected to a common point in the connection of the diodes $n1$ and $n2$, which diodes are connected to each other with their cathodes in common. The threshold device 7 is connected to a switch arm S', which is connected in parallel with the capacitor K. The output of the threshold device 7 is connected to the input of the source of control voltage 10. A second threshold device 14 is connected between the connecting leads of the source of control voltage 10 and the control circuit 1.

The second threshold device 14 is connected in series circuit arrangement with the diode $n2$, the diode $n1$, the full wave rectifier 5 and the secondary winding 4' of the current transformer 4 via an inverter 12. The feedback of the regulating circuit is not shown in order to enhance the clarity of illustration. The inverter 12 functions in the same manner as a NOT circuit to produce an output signal when no input signal is supplied thereto and to produce no output signal when an input signal is supplied thereto. A third threshold device 13 is connected between the capacitor K and the base electrode of the second transistor $p2$.

During normal operation, the control circuit 1 is supplied with a control voltage $U_{St}$. The control voltage $U_{St}$ adjusts, as in the embodiments of FIGS. 1 and 2, a specific current flow through the loads 2 and the primary winding of the current transformer 4. A voltage is induced in the secondary winding 4' of the current transformer 4 and is rectified by the full wave rectifier 5. The rectified voltage causes a current flow through the control path of the first transistor $p1$ via the diode $n1$.

The current through the control path of the first transistor $p1$ switches said transistor to its conductive condition thereby providing a discharge path for the capacitor K. The capacitor voltage is applied to the threshold device 7. The threshold device 7 has a threshold level which is such that said threshold device does not produce an output voltage if the first transistor $p1$ is in its conductive condition at any time during a half cycle or half wave.

When the load current fails, there is no voltage induced in the secondary winding 4' of the transformer 4 and the first transistor $p1$ remains in its nonconductive condition. The capacitor K thus is not provided with a discharge path, so that its voltage increases to such an extent at the commencement of the next succeeding half cycle, that the threshold level of the threshold device 7 is reached. As hereinbefore described with reference to FIG. 2, the output signal or voltage then produced by the threshold device 7 is utilized to decrease the control voltage provided by the source of control voltage or control amplifier 10.

When the control voltage is decreased to zero, the control circuit 1 is deenergized and no longer supplies firing pulses to the thyristors 3. The thyristors 3 are then deenergized and switched to their nonconductive condition and the loads 2 are deenergized commencing with the zero passage of the energizing voltage $U_S$. The threshold level of the threshold device 7, as in the embodiment of FIGS. 1 and 2, is selected so that it is exceeded by the capacitor voltage of the capacitor K only after the load current is zero for a little longer than a half cycle, period or wave of the energizing voltage $U_S$.

The energizing voltage $U_S$ is not reapplied to the loads 2, after it has been decreased to zero in the aforedescribed manner, due to deficiencies in the aforedescribed apparatus. This is due to the fact that no voltage is further induced in the secondary winding 4' of the current transformer 4, so that the first transformer $p1$ cannot be switched to its conductive condition. The control voltage supplied to the control unit 1 also remains at zero magnitude. In order to facilitate the reapplication of the energizing voltage $U_S$, after a disconnection thereof, the second threshold device 14 and the inverter 12 are provided.

The output of the inverter 12 is connected via the decoupling diode $n2$ to the control path of the first transistor $p1$. The input of the second threshold device 14 is connected to the output of the control amplifier 10. If the output voltage of the control amplifier 10 is less than the threshold level or voltage of the second threshold device 14, said second threshold device does not produce an output signal and the inverter 12 does produce an output signal. The output signal of the inverter 12 provides a current which flows via the diode $n2$ through the control path of the first transistor $p1$ and switches said transistor to its conductive condition.

When the first transistor $p1$ is switched to its conductive condition, it functions as a discharge path for the capacitor K. This prevents the capacitor voltage of the capacitor K from reaching the threshold level of the threshold device 7. The control voltage produced by the control amplifier 10 is then permitted to increase until it reaches its final magnitude after several cycles or periods of the energizing voltage $U_{st}$. The capacitor K continues to discharge periodically.

When the actual or pilot magnitude of the current decreases to zero, the first transistor $p1$ is switched to its nonconductive condition and the capacitor voltage of the capacitor K increases until it reaches the threshold level of the threshold device 7. The threshold device 7 thus produces an output signal which is supplied to the control amplifier 10 and causes the control voltage produced by said control amplifier to decrease to zero.

When the control voltage decreases to a magnitude which is less than the threshold level of the second threshold device 14, the first transistor $p1$ is again switched to its conductive condition, as hereinbefore described. As a result, the capacitor voltage of the capacitor K no longer reaches the threshold level of the threshold device 7, so that said threshold device no longer produces an output signal and the control amplifier 10 is released from said output signal. The control amplifier 10 then produces a control voltage.

The control voltage produced by the control amplifier 10, and also the firing angle of the thyristors 3, never reaches absolute zero and the loads 2 are still energized from time to time by the energizinz voltage $U_S$. In order to prevent this, the second transistor $p2$ is provided. The control path of the first transistor $p1$ and the diode $n2$ are connected in parallel with the emitter-collector path of the second transistor $p2$. The second transistor $p2$ is controlled in its conductive condition by the capacitor voltage of the capacitor K via the third threshold device 13. Threshold level or threshold voltage of the third threshold voltage is equal to or less than the threshold level of the threshold device 7.

The second transistor $p2$ is thus switched to its conductive condition even when the control amplifier 10 is operating normally to produce a control voltage. Thus, the second threshold device 14 is no longer able to control the first transistor $p1$, so that the control voltage produced by the control amplifier 10 may decrease to zero. This causes the complete de-energization of the loads 2. The entire apparatus may commence to operate again when the capacitor K is discharged via an external signal or command.

While the invention has been described by means of specific examples and in specific embodiments, we do not wish to be limited thereto, for obvious modifications will occur to those skilled in the art without departing from the spirit and scope of the invention.

We claim:

1. Apparatus for supervising the current supplied to loads via antiparallel-connected thyristors, said thyristors being connected in antiparallel relation to a load and a source of alternating electrical power for energizing said load, each of said thyristors having a control electrode for controlling the conductivity condition thereof, said apparatus comprising:

control means connected to the control electrodes of said thyristors for supplying periodically alternate pulses having phase positions relative to the alternating voltage of said source of electrical power and dependent upon a control voltage;

a source of direct voltage;

a resistor;

a capacitor connected to said source of direct voltage via said resistor;

a switch connected in parallel with said capacitor and controlled in accordance with the instantaneous value of the load current in a manner whereby said switch remains closed during the time that load current flows thereby providing discharge path for said capacitor.

threshold means connected to said capacitor having a threshold level adjusted so that said threshold means provides an output signal only if said switch has been open for at least the duration of a half period of said alternating voltage; and utilization means connected to said threshold means and responding to an output signal of said threshold means to provide a determined operation.

2. Apparatus as claimed in claim 1, wherein said utilization means comprises a signal device.

3. Apparatus as claimed in claim 1, wherein said utilization means comprises additional switch means for deenergizing said control means.

4. Apparatus as claimed in claim 1, further comprising a source of control voltage for applying said control voltage to said control means and additional switch means connecting said source of control voltage to said control means, and wherein said utilization means comprises said additional switch means and an output signal of said threshold means controlling said additional switch means to disconnect said source of control voltage from said control means thereby reducing said control voltage to zero.

5. Apparatus as claimed in claim 1, wherein said switch comprises a transistor having emitter, collector and base electrodes and an emitter-collector path connected in parallel with said capacitor, coupling means coupling said transistor to said load in a manner whereby said transistor is controlled in conductive condition by the load current.

6. Apparatus as claimed in claim 4, wherein said source of control voltage comprises a control amplifier having output means connected to said control means via said additional switch and input means, and reference means coupled between said load and the input means of said control amplifier for supplying to said control amplifier a signal corresponding to the difference between a reference value and an actual value of current, said signal corresponding to the median value of the load current.

7. Apparatus as claimed in claim 5, further comprising a source of control voltage for applying said control voltage to said control means, and additional switching means coupled between said source of control voltage and said transistor for controlling said transistor in conductive condition in accordance with the control voltage provided by said source of control voltage, and wherein said utilization means comprises said source of control voltage.

8. Apparatus as claimed in claim 6, wherein the reference means of said source of control voltage is coupled to said load via a transformer having a primary winding connected to said load and a secondary winding connected to said reference means, said transformer controlling said switch in accordance with the instantaneous value of current in said secondary winding.

9. Apparatus as claimed in claim 7, wherein said additional switching means comprises second threshold means having a second threshold level for switching said transistor to its conductive condition when the control voltage provided by said source of control voltage is less than said second threshold level.

10. Apparatus as claimed in claim 9, further comprising an additional transistor and third threshold means connected between said capacitor and said additional transistor for controlling said additional transistor in conductive condition, said third threshold means having a third threshold level smaller than or equal to the threshold level of said threshold means, said additional transistor being coupled to said transistor and controlling the said transistor in conductive condition.

References Cited

UNITED STATES PATENTS

| | | | |
|---|---|---|---|
| 3,132,287 | 5/1964 | Yarbough | 323—24 |
| 3,374,420 | 3/1968 | Weber, Jr. | 323—9 |
| 3,391,326 | 7/1968 | Sikes et al. | 317—33X |
| 3,496,417 | 2/1970 | Tenenbaum | 317—33 |

J D MILLER, Primary Examiner

G. GOLDBERG, Assistant Examiner

U.S. Cl. X.R.

317—33, 36; 323—22, 24, 36; 340—253